Aug. 9, 1927.

A. H. HAVIR ET AL

TIRE STRIPPING MACHINE

Filed Oct. 5, 1923    2 Sheets-Sheet 1

1,638,306

Inventors
ANDREW H. HAVIR
HENRY V. FLETCHER
By Paul, Paul & Moore
ATTORNEYS

Aug. 9, 1927.  1,638,306

A. H. HAVIR ET AL

TIRE STRIPPING MACHINE

Filed Oct. 5, 1923  2 Sheets-Sheet 2

Inventors
ANDREW H. HAVIR
HENRY V. FLETCHER

By Paul, Paul & Moore
ATTORNEYS

Patented Aug. 9, 1927.

1,638,306

UNITED STATES PATENT OFFICE.

ANDREW H. HAVIR AND HENRY V. FLETCHER, OF MINNEAPOLIS, MINNESOTA, ASSIGNORS, BY MESNE ASSIGNMENTS, TO EVEN J. ROHNE, OF MINNEAPOLIS, MINNESOTA.

TIRE-STRIPPING MACHINE.

Application filed October 5, 1923. Serial No. 666,772.

This invention relates to improvements in machines particularly adapted for use in peeling or stripping the outer tread layers of pneumatic tire-casings from the inner fabric layers thereof, so that the latter may again be used as a foundation for a new tread and for various other purposes such as reliners for worn casings, repair boots, etc.

The object of this invention is to provide a tire stripping machine having a pair of toothed feed rolls mounted therein over which the tire sections are fed in opposite directions, such sections being firmly held against the toothed peripheries of the feed rolls by means of complementary tension rolls, yieldingly held thereagainst.

A further object is to provide a tire peeling or stripping machine having an improved tension means arranged at each end thereof adapted to yieldably hold the tension rolls against the peripheries of the feed rolls, such tension means being independently operable by means of suitable levers provided adjacent the ends of the rolls, whereby the pressure of the tension rolls against the feed rolls may be applied or released at each end of the machine, as desired, independently of the other end thereof.

Other objects of the invention will more fully appear from the following description and the accompanying drawings and will be pointed out in the annexed claims.

In the drawings there has been disclosed a structure designed to carry out the various objects of the invention but it is to be understood that the invention is not confined to the exact features shown, as various changes may be made within the scope of the claims which follow.

In the accompanying drawings forming part of this specification,

Figure 1:
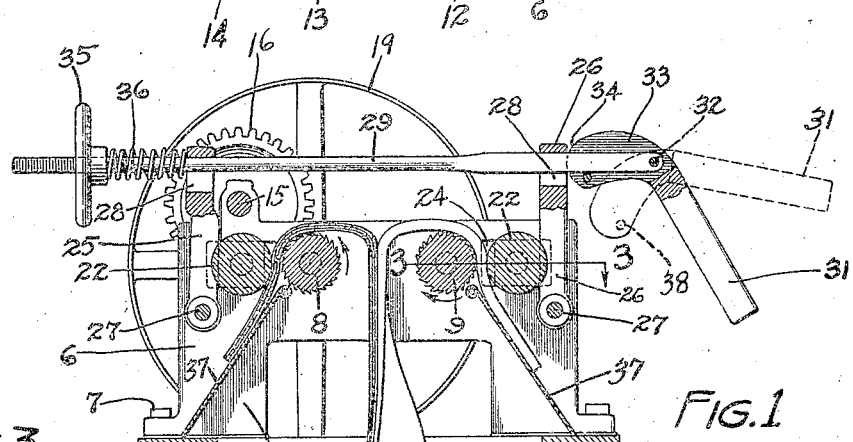
Figure 1 is a sectional view on the line 1—1 of Figure 2, showing a tire stripping machine embodying my invention.

In the accompanying drawings, there is illustrated a tire peeling and stripping machine comprising a base plate 5, to which a pair of upright end frames 6 are secured by means of bolts 7. A pair of toothed feed rolls 8 and 9 are secured to a pair of shafts 11 which are rotatably mounted in suitable bearings provided in the frames 6 at each end of the machine. As shown in Figure 1, the ends of the shaft 11 at one end of the machine, preferably extend through the end frame 6 and have a pair of similar gears 12 and 13 terminally secured thereto, such gears being adapted to mesh with each other to rotate the rolls in opposite directions. A pinion 14 meshing with the gear 13 is mounted on one end of a countershaft 15 which is similarly mounted in suitable bearings provided in the end frames 6. A gear 16 is secured to the opposite end of the countershaft 15 adapted to mesh with a pinion 17 secured to the hub 18 of the drive pulley 19. This pulley is preferably loosely mounted upon the projecting end of the shaft 11 upon which the feed roll 8 is mounted, being retained thereon by means of a collar 21 secured to the shaft. Thus, when power is applied to the pulley 19, it will be transmitted to the countershaft 15 by means of the pinion 17 and gear 16, thence through the pinion 14 to the gears 13 and 12, thereby causing the two feed rolls 8 and 9 to rotate in opposite directions, as indicated by the arrows in Figure 1.

Means are provided to yieldingly hold the outer tread layer and the fabric layers of the tire casing against the toothed peripheries of the two feed rolls when the two casing sections are being pulled apart, as shown in Figure 1. Such means consist preferably in the provision of a pair of yieldingly mounted pressure rolls 22 rotatably mounted in suitable bearings 23, which are slidably mounted in apertures 24 provided in the end frames 6, as clearly shown in Figure 3. The outer end portions of the bearings 23 are preferably square in cross-section, as shown in dotted lines in Figure 1, for the purpose of preventing the bearings from relative rotation when the rolls are rotated. The pressure rolls preferably have smooth peripheral surfaces so that they will not damage the fabric lining of the tire with which they may come in contact in the stripping operation.

Figure 2:
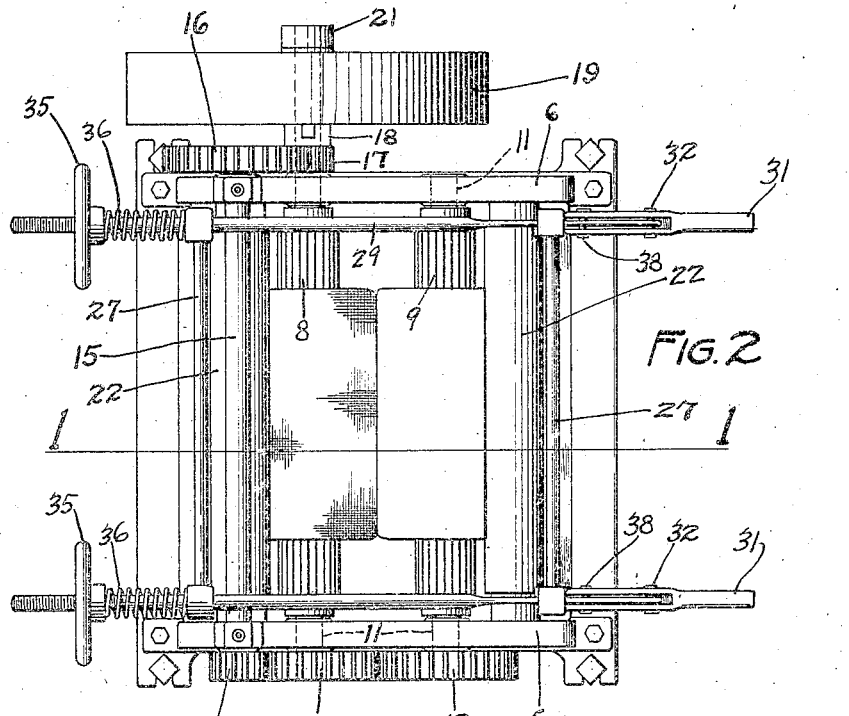
Figure 2 is a plan view of Figure 1, showing the tension means provided at each end of the machine.
Figure 3:
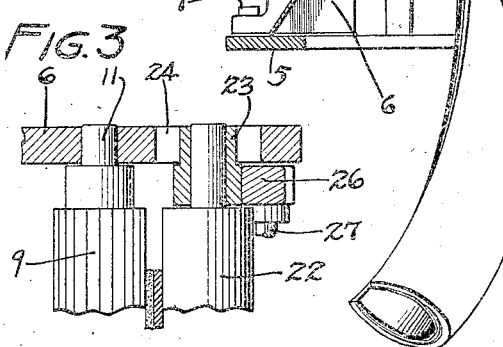
Figure 3 is a detail sectional view on the line 3—3 of Figure 1, showing the manner of mounting the rolls in the side frames.

Tension means are provided at each end of the machine for the purpose of yieldably holding the pressure rolls 22 against the casing sections, when inserted between the feed rolls and pressure rolls, as shown in the drawings. Such means consist of a pair of upright arms 25 and 26 pivotally mounted on suitable pivot pins or rods 27 secured to the inner side of each end frame 6. These arms are adapted to bear against the inner portions of the bearings 23 adjacent the ends of the rolls 22, as shown in Figure 3. The upper ends of each pair of arms 25 and 26 are provided with suitable apertures 28 in which a rod 29 is loosely mounted. One end of the rod 29 is preferably flattened and a forked tension control handle or lever 31 is pivotally mounted upon the end thereof by means of a pin 32. The tension lever 31 preferably has an integral head 33 terminally formed thereon. This head is provided with a cam surface 34 adapted to engage the outer face of the arm 26, when positioned as shown in full lines in Figure 2, in which position the rod 29 will be under tension. The other end of the rod is preferably threaded to receive a hand wheel 35 and a compression spring 36 is interposed between the upright arm 25 and the hub of the hand wheel 35, adapted to put the rod 29 under tension. Thus, it will readily be seen that when the tension means above described, are positioned as shown in Figure 2, an inward pressure will be imparted to the opposed arms 25 and 26, at each end of the machine, causing them to bear against the bearings 23 of the pressure rolls and thereby yieldably holding such rolls against the separated casing sections, or against the toothed peripheries of the two feed rolls 8 and 9. The pressure applied to the rolls may readily and conveniently be adjusted by simply rotating the hand wheels 35 to increase or decrease the pressure as desired. Suitable inclined guide plates 37 are positioned beneath each pair of rolls to outwardly guide the separated ends of the casing sections as they are being pulled apart. A stop pin 38 is also preferably provided in the lower portion of the head 33 of the operating handle, to limit the downward movement thereof when in operative position, as shown in full lines in Figure 1. The desired degree of pressure on the rolls is obtained by the adjustment of the hand wheels 35 and the compression of the springs 36 as above described, but the instantaneous release and quick control of the pressure rolls is obtained through the medium of the hand-operated levers 31. The machine attendant will stand between these levers in position to grasp one lever with one hand and the other lever with the other hand and if, for any reason, the feed of the fabric becomes twisted or uneven he can instantly, by the manipulation of a lever, release the pressure at the end of one roll and, if desired, to a certain degree, release it at the other end, and by the relative vertical oscillation of these levers he can have immediate control over the feed of the fabric and can keep it in its proper alignment between the feed and pressure rolls. This manner of controlling the pressure rolls and the feed of the material we have found to be an important feature of the machine.

In the operation of this apparatus the usual marginal beads provided on the edges of the tire casing are preferably removed, and a cross cut made through the casing, after which the outer tread layer and inner fabric layers are usually pulled apart by hand, a short distance back from one of the severed ends of the casing. The tension lever 31 is then released to the position shown in dotted lines in Figure 1, thereby releasing the pressure of the rolls 22 against the feed rolls 8 and 9 so that the free ends of the casing sections, thus pulled apart, may be inserted between the rolls in the manner shown in Figure 2. The lever 31 is then moved downwardly to the full line position shown in the above figure, thereby yieldingly forcing the pressure rolls 22 against the separated tire sections, and therefore such sections against the toothed peripheries of the feed rolls so that there will be no slippage between the tire sections and feed rolls when the latter are actuated.

An important feature of this apparatus resides in the novel tension means, hereinbefore described, by the use of which the pressure of the rolls 22 against the feed rolls 8 and 9 may be independently controlled at each end of the machine, thereby allowing the tension to be released from the rolls at one end of the machine while still under tension at the other end thereof. This feature is of particular value when stripping a tire casing of unequal thickness, as such casings have a tendency to cause the separated sections to crowd to one side of the machine, causing them to contact with the end frames 6. By the employment of the tension means here shown, this difficulty may be readily avoided while the machine is in operation by the simple manipulation of the tension levers 31. In stripping a tire casing, should the separated tread and fabric layers tend to crowd to one end of the machine they may readily be guided back to the center of the rolls by simply releasing the tension from the ends of the rolls farthest away from the tire sections. As soon as the tension is thus released from one end of the rolls, the unequal pressure of the rolls 22 against the tire sections, will cause such sections to reverse their lateral movement simultaneously as they are being fed between the two pairs of rolls. When the tire sections have returned to the desired position between the side frames 6, the tension may again be applied to the ends of the rolls heretofore released, thereby causing the sections to be fed through the machine without lateral movement. Thus, it will readily be seen that the tread and fabric sections of uneven thickness may readily and conveniently be guided through the machine without lateral movement by the simple manipulation of the independently operated tension levers 31.

Figure 4:
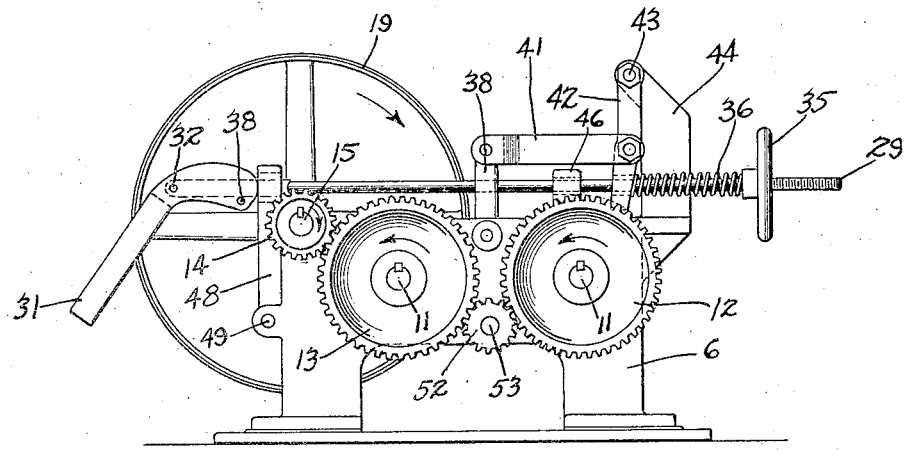
Figure 4 is an end elevation of a tire stripping machine of modified construction.
Figure 5:
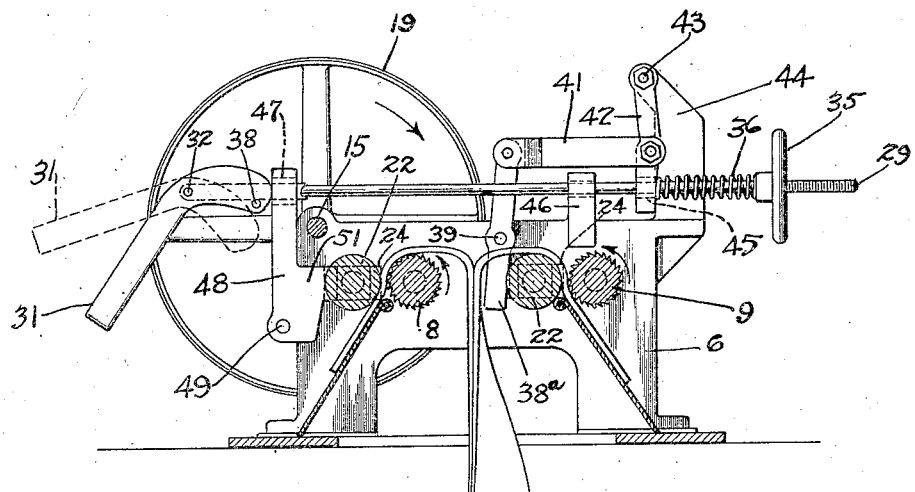
Figure 5 is a cross sectional view of the machine shown in Figure 4.

In Figures 4 and 5 there is shown a tire stripping machine of modified construction, wherein the two feed rolls 8 and 9 are arranged to rotate in the same direction. As here shown, the relative position of the feed rolls 9 with reference to its complementary pressure roll 22, has been reversed from that shown in Figures 1, 2 and 3, while the relative position of the feed roll 8 and its complementary roll 22 is similar to that shown in the above figures. When the rolls are thus arranged one of the tire sections will be fed over the feed roll 8 in a manner similar to that shown in the preferred construction, while the other section will be fed over the complementary pressure roll 22 of the feed roll 9. Thus, it will be seen that in order to securely grip the tire section, passing between the two latter rolls, the pressure exerted against the pressure roll 22 adjacent the feed roll 9 must be in the same general direction as that exerted against the roll 22 adjacent the feed roll 8, or in a direction opposite to that shown in Figures 1, 2 and 3.

This is accomplished by means of an independently controlled tension means being provided at each end of the machine, the action of which is similar to that shown in the preferred construction (Figures 1, 2 and 3). As the tension control means provided at each end of the machine are identical, but one side will be described, like parts being referred to by like numerals.

An arm 38ª is pivotally mounted upon a stud or pin 39 secured to the end frame 6. The lower end portion of this arm is adapted to engage the inner portion of the bearing 23 and the upper end thereof is pivotally connected to a link 41, having its other end similarly connected to a depending arm 42, pivotally mounted upon a stud 43 supported by an upwardly extending integral lug 44 of the end frame 6. An aperture 45 is terminally provided in the lower end of the arm 42, adapted to receive the threaded end portion of the rod 29, upon which the compression spring 36 and hand wheel 35 are mounted. An integral guide lug 46 is preferably provided on the end frame 6 and upwardly extends therefrom to provide a guide for the rod 29, passing therethrough. The other end of the rod passes through an aperture 47 provided in the upper portion of an upright arm 48, which has its lower end pivotally connected to the end frame by means of a stud or pin 49. An off-set portion 51 is integrally formed on the side of the arm 48, adjacent the pressure roll, adapted to engage the inner portion of the adjacent bearing 23 for the purpose of exerting an inward pressure thereto, and therefore on the roll. The tension lever 31 is similarly mounted on the end of the rod 29, by means of which the tension may be applied to, or released from the pressure rolls, as desired, in a manner similar to that employed in connection with Figures 1, 2 and 3.

Referring to Figure 5, it will be noted that the mounting of the compression spring 36 upon the rod 29, is such that it will exert an outward pressure against the hub of the adjusting wheel 35, and simultaneously an equal pressure will be exerted in the opposite direction against the outer face of the depending arm 42. Thus, it will be seen that the action of the spring 36, when thus positioned, will cause the rod 29 to be put under tension, thereby yieldingly forcing the off-set portion 51 of the arm 48 against the adjacent bearing 23 of the pressure roll. The pressure roll 22 adjacent the feed roll 9 will similarly be held against the feed roll, as a result of the spring 36 tending to force the depending arm 42 away from the hand wheel 35, thereby exerting a pressure against the arm which will be transmitted through the link 41 to the upper end of the arm 38. Such action will cause the arm 38 to oscillate upon the pin 39, thereby causing the lower end portion thereof to exert a pressure against the adjacent bearing 23 of the roll 22 in a manner similar to that described with reference to the other rolls. Thus, it will be seen that the operation and action of the tension means above described will be similar to the tension means described with reference to Figures 1, 2 and 3.

The driving means shown in Figures 4 and 5 have also been slightly modified over that shown in Figures 1 and 2. As here shown, the pulley 19 is terminally secured to the end of the countershaft 15, instead of being loosely mounted upon the projecting end portion of the shaft 11 of the feed roll 8. The pinion 14 is similarly mounted upon the other end of the countershaft 15 in mesh with the gear 13. An intermediate idler pinion 52 is preferably mounted upon a stud 53, secured to the end frame 6, and is adapted to mesh with the gears 12 and 13. By the provision of this pinion the two feed rolls 8 and 9 will rotate in the same direction, as indicated by the arrows in Figure 4.

We claim as our invention:

1. A device of the class described comprising a frame, feed and pressure rolls mounted thereon in parallel relation, the pressure rolls adapted for translation toward the feed rolls, pivoted levers engaging the pressure rolls, one at each end of each roll, link connections between each end pair of levers, holding the levers yieldably against the pressure rolls, each link connection having a lever controlled cam pivoted thereto engageable with a lever, to simultaneously hold each end pair in operative position, both cams being on the same side of the machine, and accessible for single or simultaneous operation 2. A machine of the class described comprising a frame, a pair of feed rolls, pressure rolls mounted to contact with said feed rolls and grip between them the webs of the fabric to be separated, means for revolving said feed rolls, and lever controlled means including connections across the machine for applying a variable pressure simultaneously to corresponding ends of both pressure rolls and to both ends thereof, whereby the pressure at one end of both rolls may be made greater or less than at the opposite end thereof.

3. A machine of the class described comprising a frame, feed and pressure rolls alternately arranged therein and adapted to receive between them the webs of fabric to be separated, means for revolving said feed rolls in the same direction, and lever controlled means for pressing said pressure rolls at both ends toward said feed rolls with a yielding pressure, the pressure being applied simultaneously to corresponding ends of each roll.

4. A machine of the class described, comprising a frame, feed rolls mounted therein, pressure rolls mounted to contact with said feed rolls and grip the webs of the fabric to be separated between them, arms mounted to bear against said pressure rolls, rods connecting said arms and compression springs thereon having an adjusting means and cam levers arranged to move said rods longitudinally to put said springs under compression or release them.

5. A machine of the class described comprising a frame, rolls mounted in pairs therein with a space between the pairs of rolls, one roll of each pair having a roughened surface and forming a feed roll, the other rolls of the pairs being movable toward and from said feed rolls and forming pressure rolls, means for revolving said feed rolls to separate the layers of a fabric sheet inserted in the space between the rolls, the ends of the fabric sheets being inserted between the rolls of the pairs, and lever controlled means for forcing said pressure rolls at both ends toward said feed rolls to grip the ends of the fabric layers and means whereby the attendant can instantly separate said feed and pressure rolls to permit re-alignment of the fabric between them, the pressure being applied simultaneously to corresponding ends of each roll.

6. A machine of the class described comprising a frame, feed rolls mounted therein, pressure rolls mounted to press the webs of material to be separated against said feed rolls, means for revolving said feed rolls, arms bearing on said pressure rolls for forcing them toward said feed rolls, links connecting the arms across the machine and control levers mounted to oscillate vertically on the links for controlling the operation of said arms.

7. A machine of the class described comprising a frame, feed rolls mounted therein, pressure rolls mounted to contact with said feed rolls and grip the webs of the fabric to be separated between them, rods arranged transversely of said rolls and having a yielding take-up means for oscillating cam levers adapted to exert a longitudinal pull on said rods, and means actuated by the movement of said rods and levers for forcing said pressure rolls towards said feed rolls.

8. A machine of the class described comprising a frame, feed rolls mounted therein, means for pressing the webs of material to be separated against said feed rolls, means for revolving said feed rolls, levers engaging the pressing means, and links yieldably connecting said levers whereby an attendant may release the pressure on both feed rolls simultaneously.

9. A machine of the class described comprising a frame, feed rolls mounted therein, means for pressing the webs of material to be separated against said feed rolls, means for revolving said feed rolls, levers engaging the pressing means, and links yieldably connecting said levers, and having cams within control of the machine attendant stationed at one side of the machine for instantly releasing the pressure on both feed rolls.

10. A machine of the class described comprising a frame, means mounted therein for engaging the free ends of adhering layers of material to be separated and pulling them apart, means for clamping said layers during the separating operation including levers and yieldable connections between pairs of levers, and mechanism for releasing said clamping means at two points to allow quick control of and re-alignment of the material being separated.

In witness whereof, we have hereunto set our hands this 28th day of September, 1923.

ANDREW H. HAVIR.
HENRY V. FLETCHER.